United States Patent [19]

Gomes

[11] Patent Number: 5,168,458
[45] Date of Patent: Dec. 1, 1992

[54] METHOD AND APPARATUS FOR GAGING THE DEGREE OF LOBULATION OF BODIES SUCH AS THREADED FASTENERS

[75] Inventor: Kenneth Gomes, Mattapoisett, Mass.

[73] Assignee: Research Engineering & Manufacturing, Inc., Middletown, R.I.

[21] Appl. No.: 550,701

[22] Filed: Jul. 10, 1990

Related U.S. Application Data

[63] Continuation-in-part of Ser. No. 494,612, Mar. 16, 1990, abandoned.

[51] Int. Cl.⁵ .............................................. G01B 7/28
[52] U.S. Cl. ................................ 364/560; 33/199 R; 33/546; 364/554
[58] Field of Search ............. 364/560, 563, 554, 474.37; 33/543, 545, 546, 550, 784, 199 R

[56] References Cited

U.S. PATENT DOCUMENTS

| | | | |
|---|---|---|---|
| 3,879,854 | 4/1975 | Johnson | 33/199 R |
| 4,064,633 | 12/1977 | Wertepny | 33/550 X |
| 4,490,800 | 12/1984 | Powers | 364/563 X |
| 4,625,429 | 12/1986 | Danielli | 33/550 X |
| 4,651,438 | 3/1987 | Hutter et al. | 33/550 |
| 4,662,074 | 5/1987 | Knapp et al. | 33/546 X |
| 4,736,313 | 4/1988 | Nishimura et al. | 364/563 |
| 4,787,814 | 11/1988 | Vaerman | 33/550 |
| 4,930,096 | 5/1990 | Shimizu et al. | 33/784 |
| 4,964,071 | 10/1990 | Grosvenor | 364/560 |
| 5,060,173 | 10/1991 | Tsuji | 364/560 |

Primary Examiner—Kevin J. Teska
Assistant Examiner—Michael Zanelli
Attorney, Agent, or Firm—Trexler, Bushnell, Giangiorgi & Blackstone, Ltd.

[57] ABSTRACT

A method for gaging the geometry of bodies includes providing a gage for measuring a plurality of cross-sectional dimensions of a body and positioning a body in surface-to-surface contact with the gage. The method proceeds by recording information corresponding to the dimensions as measured by the gage, to form recorded data, the ascertaining information related to the geometry of the body from this recorded data. Apparatus is also provided for carrying out this method.

9 Claims, 2 Drawing Sheets

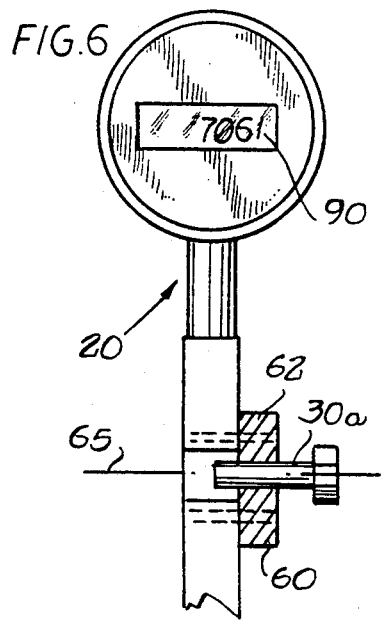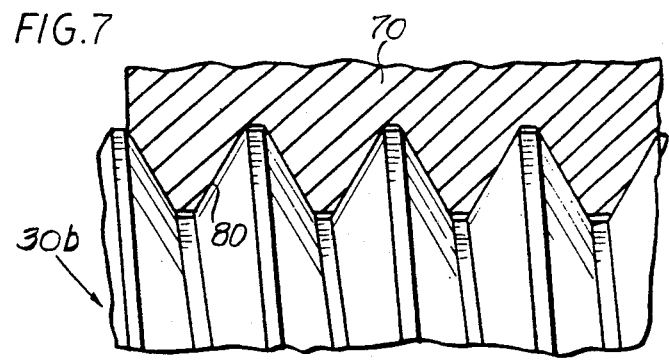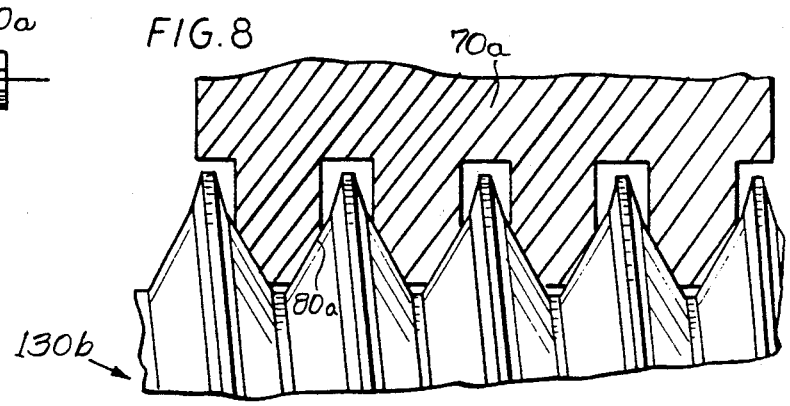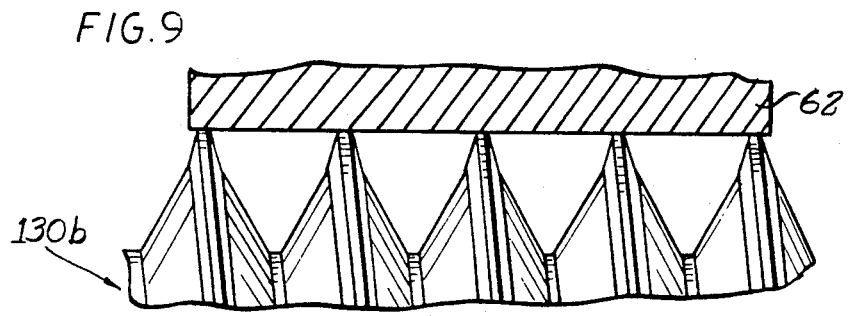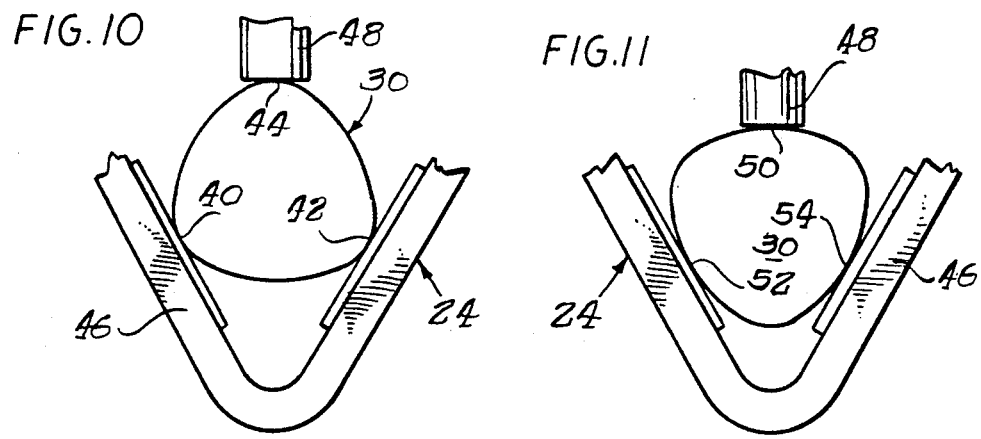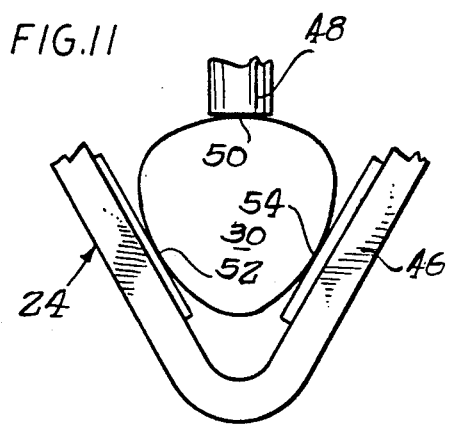

METHOD AND APPARATUS FOR GAGING THE DEGREE OF LOBULATION OF BODIES SUCH AS THREADED FASTENERS

CROSS-REFERENCE TO RELATED APPLICATION

This application is a continuation-in-part of my earlier application Ser. No. 494,612 filed Mar. 16, 1990, now abandoned.

A portion of the disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all copyright rights whatsoever. This material is contained in a computer program listing printout in the form of a microfiche appendix comprising 1 sheet of 20 frames.

BACKGROUND OF THE INVENTION

This invention is directed to the threaded fastener arts and more particularly to a novel and improved method and apparatus for gaging threaded fasteners and/or fastener blanks.

Such gaging is preferably carried out in order to determine deviations of the dimensions of such fasteners and/or blanks from the specified or desired dimensions, which data may be utilized for statistical in-process control, for lot control and the like. While the method and apparatus of the invention may be utilized with both round body and poly-arcuate or lobular bodied fasteners and their blanks, as well as other similar bodies such as round or poly-arcuate pins, shafts, shanks or the like, the ensuing discussion will be directed primarily to the gaging of poly-arcuate or lobular fasteners. The use of the term "fastener" herein should be understood as including both a fastener blank and a threaded fastener fabricated from such a blank.

The gaging of lobular fasteners has traditionally been a somewhat complicated task, because the degree of lobulation or out-of-roundness is just as important as the basic thread dimensions in the formation of these fasteners. The degree of lobulation, or out of round, is usually defined as half the diametral difference between the inscribed and circumscribed circles of a cross-section arcuate form of the fastener. Such lobular fasteners are used extensively both as thread-forming screws and for self-locking, or sealing purposes in pre-tapped holes. In either of these general applications control of the degree of lobulation is important in assuring proper performance of the product. For example, this degree of lobulation (commonly designated K) must exceed a certain minimum for thread-forming with a reasonable driving effort or for entry into a preformed thread and adequate sealing or self-locking with acceptable driving effort. On the other hand, if this K or degree of lobulation exceeds a certain maximum amount, the tensile load-carrying ability of the joint in the work may be seriously compromised, due to reduced surface thread contact area of the threads.

In the past, conventional screw threads have often been measured by threading each fastener to be tested into each of a pair of so-called ring or functional gages, which have internal threads corresponding with maximum and minimum allowable external thread dimensions of the fastener. An acceptable product was considered to be one which could be threaded into the maximum gage but not into the minimum gage. However, it should be recognized that non-entry into the minimum gage could be the result of only a single over-size thread element or portion, and would not imply any control whatever on the individual minimum thread dimensions of the fastener. In recent years this condition has been alleviated somewhat through the use of pitch diameter micrometers, individual element indicator gages and other techniques.

Past methods of gaging the cross-sectional dimensions of lobular thread-forming and self-locking screws used hand micrometers. In a first measurement, a multi-anvil type micrometer was used, in which the fastener was rotated to obtain the maximum reading; that is, the diameter of the circumscribing circle "C". In a second operation, a more or less conventional micrometer was used to obtain the "D" dimension, which is a cross-section from a high point of one lobe to a low point opposite. It was not the practice, however, to calculate the difference between these two micrometer readings; i.e., the K, or out of round dimension. That is, the dimensions C and D of the fastener alone, even if themselves within acceptable limits, do not guarantee an acceptable K or out of round dimension. Moreover, the two-step inspection process utilizing two micrometers is quite cumbersome to perform, is time-consuming, requiring individual handling and inspection of each part to be inspected and gaged in this method, and also effectively doubles the potential for measurement error.

OBJECTS AND SUMMARY OF THE INVENTION

Accordingly, it is a general object of the invention to provide a novel and improved method and apparatus for gaging threaded fasteners and/or fastener blanks.

A more particular object is to provide such a method and apparatus which can readily determine the K dimension of a lobular fastener of other lobular bodies or parts.

Briefly, and in, accordance with the foregoing objects, a method for gaging the geometry of bodies such as fasteners comprises providing gage means for measuring a plurality of diametral cross-sectional dimensions which define the geometry; positioning a fastener in surface-to-surface contact with said gage means; recording information corresponding to the dimensions as measured by said gage means during said positioning of said body in said surface-to-surface contact therewith, to form recorded data, and ascertaining information related to the geometry of the body from said recorded data. The invention also provides apparatus for carrying out this method.

BRIEF DESCRIPTION OF THE DRAWINGS

The features of the present invention which are believed to be novel are set forth with particularity in the appended claims. The organization and manner of the operation of the invention, together with further objects and advantages thereof may best be understood by reference to the following description, taken in connection with the accompanying drawing in which like reference numerals identify like elements, and in which:

FIGS. 5 and 6 are enlarged partial views, partially in cross-section of the respective roller gage apparatuses of FIG. 1;

FIG. 7 is an enlarged, partial cross-sectional view through a grooved roller apparatus of a form for engagement with a threaded fastener having a conventional thread form;

FIG. 8 is a cross-section similar to FIG. 7 showing a modified form of grooved roller formed for engagement with a threaded fastener having a modified thread form;

FIG. 9 is a cross-sectional view similar to FIGS. 7 and but showing engagement of a threaded fastener by the smooth-faced roller of FIG. 4; and FIGS. 10 and 11 illustrate engagement of a trilobular fastener with an alternate form of gaging instrument illustrated in FIG. 1.

DETAILED DESCRIPTION OF THE ILLUSTRATED EMBODIMENT

Figure 1:
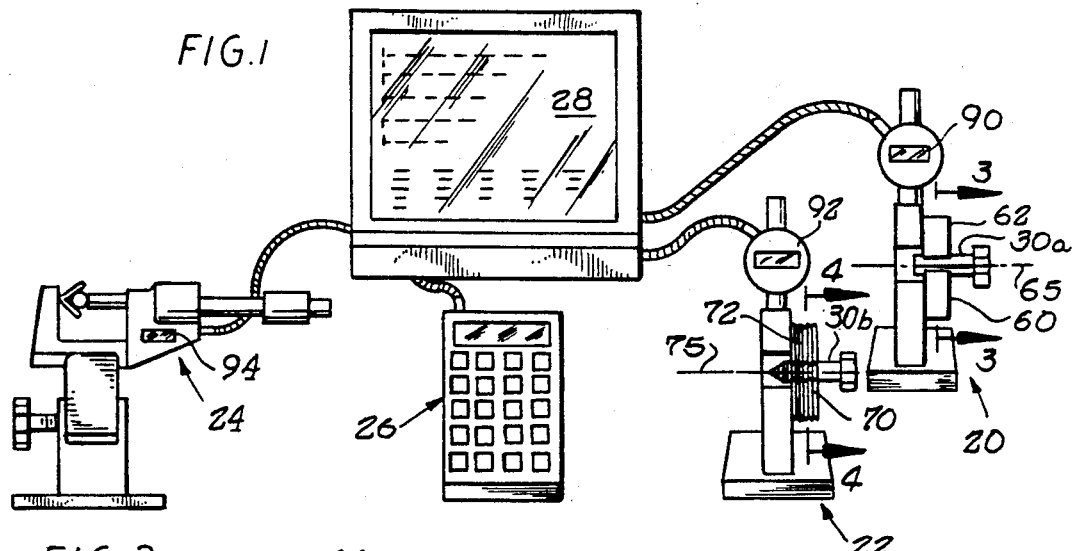
FIG. 1 is a view of an apparatus in accordance with the invention, suitable for carrying out the method of the invention.

Referring now to the drawings and initially to FIG. 1, there is shown an apparatus in accordance with the invention which is also suitable for carrying out the method of the invention. The apparatus includes at least one gage apparatus or gage means such as a roller-type gage 20, which will be more fully described hereinbelow. In the illustrated embodiment, a second similar roller-type gage 22, also to be more fully discussed hereinbelow is also provided. Alternatively, a gage of the type indicated by reference numeral 24 in FIG. 1 might be utilized, although roller-type gages such as gages 20 and 22 are preferred. The alternate type gage 24 is of the type referred to as a V-anvil micrometer.

Figure 5:
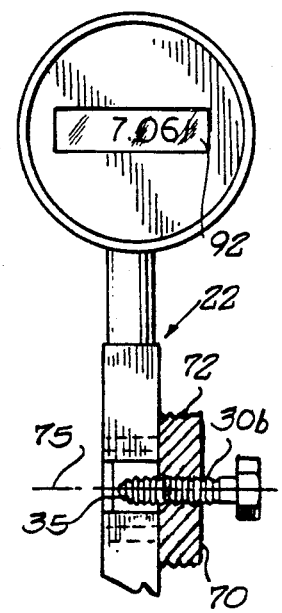

The method of the invention gages the out of round or so-called K dimension of a fastener which may be a threaded fastener or an unthreaded fastener blank, as the term "fastener" is to be understood, when used hereinafter. The fastener may be poly-arcuate or lobular in shape, or round. In the former case, the K dimension may also be referred to as the degree of lobulation. However, the ensuing description is facilitated by reference particularly to a trilobular body 30, which may be a fastener blank or a trilobular threaded fastener. A trilobular body 30 is indicated generally in FIG. 2. An unthreaded trilobular blank, which is designated by reference numeral 30a is shown in FIGS. 1 and 6, while a completed threaded trilobular fastener designated by reference numeral 30b is shown in FIGS. 1 and 5. The fastener 30b may also be provided with a tapered or conical lead-in surface or tip 35, such as in a thread-forming type of fastener.

Figure 3:
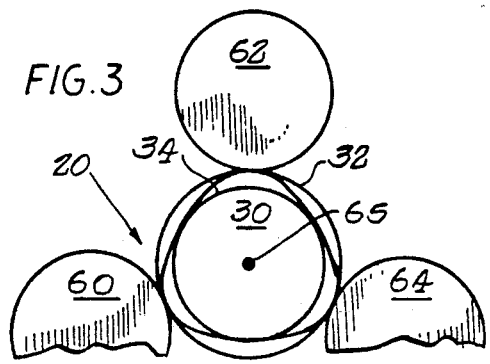
FIG. 3 is an enlarged, partial cross-sectional view of a roller-type gage instrument of the apparatus of FIG. 1, taken on the line 3—3 of FIG. 1.
Figure 4:
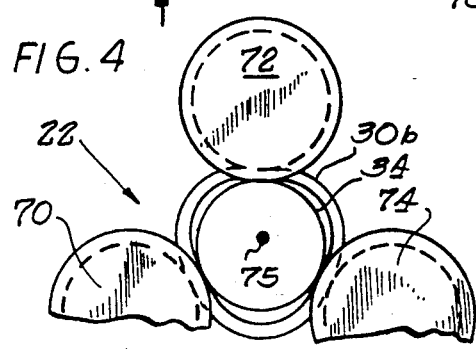
FIG. 4 is an enlarged, partial cross-sectional view of a second roller-type gage instrument forming a part of the apparatus of FIG. 1, taken on the line 4—4 of FIG. 1.

The trilobular body 30 in the example shown in the drawings, is placed in surface-to-surface contact with one or both of the gages 20 and 22 shown in FIG. 1 for measuring the dimensions C, E which correspond respectively to diameters of circumscribing and inscribing circles 32, 34 of the trilobular body 30. The orientation of a body 30 (which may be blank 30a or threaded fastener 30b) with respect to the gage 20 is indicated in cross-section and somewhat diagrammatically in FIG. 3. In similar fashion, the engagement of a threaded fastener 30b with the gage 22 is shown in somewhat diagrammatic cross-sectional form in FIG. 4. A somewhat enlarged view of the gages 20 and 22 as illustrated in FIG. 1 are found in FIG. 5 (gage 22) and in FIG. 6 (gage 20). Typical gaging of the circumscribing and inscribing circles for a trilobular body 30 generally with the anvil-type micrometer 24 are shown in FIGS. 10 and 11, respectively. The ensuing discussion will refer, in additional detail to the gages as illustrated in these respective figures of drawing and to the gaging method of the invention for gaging both threaded and unthreaded fasteners, both of poly-arcuate and round form, as well as similar bodies, to determine out-of-roundness thereof.

Referring to FIG. 1, the apparatus and method of the invention proceed by recording data corresponding to the measurements made by the respective gages and ascertaining a predetermined relationship between the inscribed circle and circumscribed circle from this recorded data. The means for recording and processing the data is indicated at FIG. 1 as a data-processing unit 26. An additional CRT type display 28 may also be coupled with the data-processing unit 26 to display data associated with these measurements. We have selected as data-processing unit 26 a DATAbank Plus System from Brown & Sharpe, Inc., North Kingstown, R.I. We have modified the Databank Plus software, as indicated in the microfiche appendix. Any CRT display may be used, we have selected a Wyse monitor.

Figure 2:
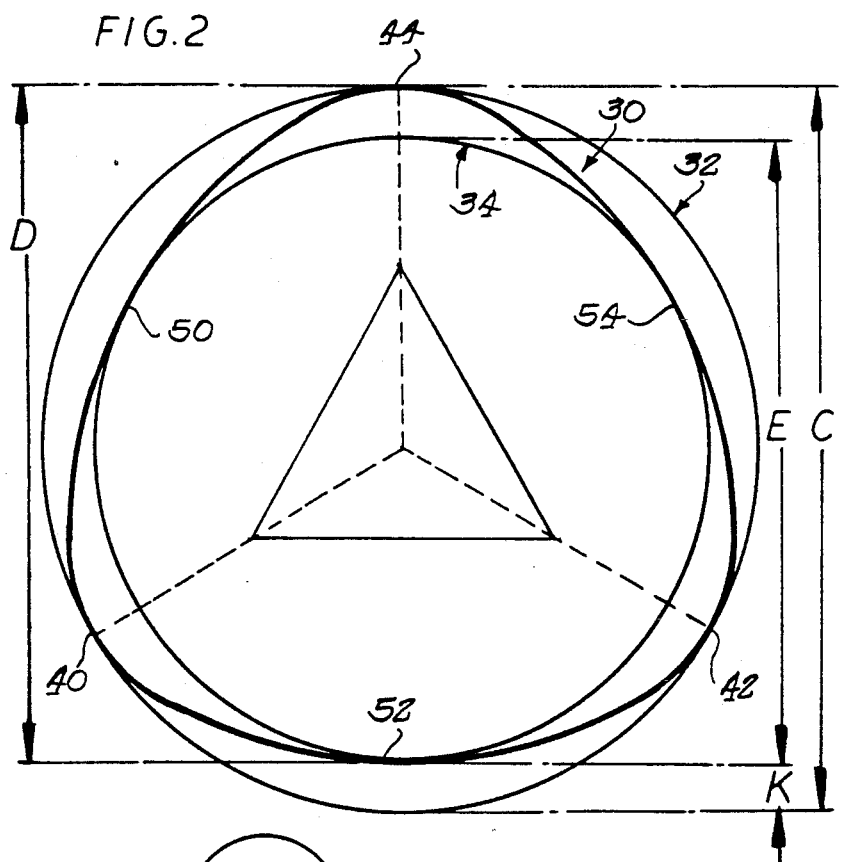
FIG. 2 is a diagrammatic cross-sectional view of a trilobular body indicating various dimensions and dimensional relationships thereof.

Referring now to FIG. 2, we have discovered that useful statistical data for manufacturing control and batch processing can be obtained by determining the difference between the respective pitch cylinder diameters corresponding to the respective inscribed or inscribing circle 34 (E) and circumscribed or circumscribing circle 32 (C) of a poly-arcuate or lobular body. One-half of this difference constitutes the K or out of round dimension of the body. In this regard it will be seen that a trilobular body has been illustrated in diametral cross-section in FIG. 2. This trilobular body 30 has a geometry as is generally described in U.S. Pat. No. 3,195,156, to Phipard, for example. That is, the trilobular cross-sectional shape will be seen to have three lobes 40, 42, 44 that are separated by arcuate sides 50, 52, 54 such that the lobes generally define an arcuate equilateral triangle. The circumscribing circle 32 or diameter C will be seen to form tangents to the three lobes, while the inscribing circle 34 or diameter E forms a tangent to the arcuate sides.

As mentioned hereinabove, we have found that one-half of the difference between these diametral dimensions, sometimes designated as the K dimension, out of round, or degree of lobulation of the lobular shape, is a significant measurement in determining product geometry acceptability.

Briefly, when using the anvil-type micrometer 24, and referring to FIGS. 10 and 11, the circumscribing circle is measured as shown in FIG. 10 by placing the lobes 40, 42 and 44 of the body 30 in contact with the respective three relevant surfaces of the micrometer. It will be seen in this regard that the micrometer has a generally V-shaped anvil portion 46 and a selectively advanceable and retractable, preferably flat-ended cylindrical spindle member 48. Similarly, as seen in FIG. 11, the inscribing circle diameter is obtained by placing the arcuate sides 50, 52 and 54 in surface-to-surface contact with the respective flat internal surfaces of the V-shaped anvil 46 and the spindle 48.

While the method and apparatus have been described thus far with reference to a trilobular body 30, it should be recognized that the apparatus and method herein described is also applicable to measuring unacceptable ovality of out-of-roundness of round-bodied fasteners whether threaded or unthreaded blanks, as well. Often this condition goes undetected using presently available gaging systems.

Referring now in more detail to FIGS. 3-9, the method and apparatus for obtaining these measurements with the roller-type gages 20, 22 is illustrated. Initially, it will be seen that each of the roller-type gages 20, 22 includes a plurality of rollers in a spaced circumferential array about a central axis. While any suitable commercially available gage components may be utilized, we have selected an Electronic Dial Indicator from Brown & Sharpe, Inc., North Kingstown, R.I., and a roller gage from Johnson Gage, Bloomfield, Conn. Alteration of the number and positioning of rollers, as may be required for polygonal or poly-arcuate shapes other than trilobular, is within the scope of the invention. In the illustrated embodiment, preferably three such rollers 60, 62, 64 and 70, 72, 74 are arrayed at 120° intervals about central axes 65, 75. It will be seen that, when a body 30, (be it threaded fastener 30a or blank 30b) is inserted into each gage, its axis is also coincident with the central gage axis 65, 75.

The rollers 60, 62 and 64 of gage 20 are arranged with smooth surfaces for contacting an outer surface of the body to be measured, which body may be an unthreaded member such as blank 30a or a threaded fastener such as fastener 30b, as well as being either lobular or round in form. These rollers can measure both the circumscribed circle 32 and the inscribed circle 34 of an outer surface of the body as the body to be measured is rotated therewithin. In the case of a threaded fastener such as fastener 30b, these measurements will yield a measure of the K, or out of round dimension of the outer diameter or thread crest diameters of the fastener.

In the case of a threaded fastener such as fastener 30b, an additional gage such as gage 22, which employs grooved rollers 70, 72 and 74, arranged for measuring the C and E dimensions corresponding to the circumscribing and inscribing circles 32, 34 at the pitch line or pitch diameter of the thread. This measurement by the use of grooved rollers is illustrated further in FIGS. 7 and 8. The measurement of the crest or outer diameter of the threads by rollers of the gage 20 is illustrated with respect to roller 62, for example, in FIG. 9. Accordingly, for a threaded fastener two separate out of round or K dimensions will be determined, one for the outer diameter of the thread and one for the pitch line diameter of the thread.

Accordingly, the rollers 60, 62 and 64 are generally right cylindrical members having smooth continuous surfaces. However, the rollers 70, 72 and 74 are circumferentially grooved. These grooves, indicated by reference numeral 80 in FIG. 7, and an alternative groove form indicated by reference numeral 80a in FIG. 8 are shaped to make contact with the threads of a threaded fastener in such a way as to effect the measurement of the C and E dimensions at the pitch line or pitch diameter of the fastener. Moreover, the respective grooves 80 and 80a are further shaped in complementary form to the pitch or shapes of the threads which they are intended to measure at the pitch line. For example, the grooves 80 of FIG. 6 are generally tapered in a complementary fashion for entering the threads of the fastener 30b shown therein.

On the other hand, exemplary fastener 130b of FIG. 8 has a somewhat different thread pitch profile and hence the grooves 80a are somewhat more rectangularly shaped at their inner aspects and convergent at their outer aspects to accommodate this thread-form of fastener 130b. The thread form of fastener 130b is generally that described in U.S. Pat. No. 4,820,098 to Taubert et al, wherein the flank angle of the thread is on the order of 60 and the flank angle of the thread crests extending beyond the nominal diameter of the screw is on the order of 30°. Accordingly, the form of the grooves 80a is varied somewhat to accommodate this sort of thread form. The form of the grooves 80, 80a may be further varied as appropriate for any desired thread form angle design without departing from the invention. That is, the grooved rollers 70, 72, 74 are shaped to contact the fastener in such a way as to measure the C and E dimensions at the pitch line. The actual form of the grooves may be said to be complementary with the thread pitch angle or thread form of the fastener to be so measured.

In accordance with the method and apparatus of the invention, suitable direct indicators or indicator means 90, 92 and 94 may also be provided on the respective gages 20, 22 and 24 for a direct read-out of the respective fastener dimensions as they are gaged.

The method and apparatus of the invention also contemplate measuring the shape or envelope of a tapered, lead in or thread-forming portion 35 (see FIG. 5) of a thread forming type of fastener. This is preferably accomplished using the roller-type gages 20, 22 as best viewed in FIGS. 4 and 5. In accordance with the method of the invention, the lead-in portion of the fastener is rotated several full 360° turns within the rollers, thus axially advancing the same somewhat relative to the rollers. The data developed in response to this rotation and advancement can be further utilized by the data-processing means 26 to develop data representative of the shape or envelope of the lead-in portion of such a fastener. In the gaging of the "full threads" of the body away from the lead-in portion of the fasteners, the method of the invention contemplates rotating the fastener 30 substantially 360° and obtaining statistical data therefrom for determining the "aggregate" out-of-round dimension of the fastener.

In the case of thread rolling or thread-forming screws, it is estimated that as much as 95% or more of the work or effort in forming internal threads is performed by the lead threads. The lead threads may be considered to be enveloped or circumscribed within a lobular, frustoconical shape with lobes corresponding in number with those of the body threads. The angle of this cone and number of lead threads is governed by the individual product specifications from one fastener to another. However, it will be appreciated that the C and E dimensions will therefore vary from thread to thread, along this tapered lead-in portion. The driving effort in the installation of such a thread-rolling or thread-forming screw is generally indicated by the applied torque measured over the degrees of rotation (expressed in radians) of the screw. As the screw is driven, the rotation is accompanied by a progressive radial outward movement of the lead threads with increasing torque in forming complementary internal mating threads in the workpiece or nut. Consequently, the method and apparatus of the invention may also be used in evaluating the relationship of the K or out-of-round dimension to the rotation of the lead threads of such a thread-forming fastener, to assure the same are formed in such a manner as to obtain the desired driving effort and thread forming action.

Using the method and apparatus of the invention, the depth of the grooves 80 would be dictated by product specifications, as mentioned above. However, this could be varied up to 0.325 P (pitch). As the point threads are captured within the grooved rolls and the screw is rotated, the gage readings will follow the generally undulating pattern of the lobular form with the measured values increasing along a slope generally the same as the slope of the point angle of the lead threads until the body threads of a uniform or constant width or diameter are reached. Accordingly, a measure is obtained of radial penetration of the threads against rotation of the fastener and the gradual formation of complementary internal or mating threads in a workpiece. This path of radial penetration versus rotation can be plotted or recorded in appropriate fashion by the data-processing means 26 and for display upon the display means 28. The taper of the lead-in portion may also be measured against a desired specification for the product by use of the method and apparatus of the invention.

We prefer the use of the roller-type gages over the method using the so-called V-anvil gage as discussed above with reference to FIGS. 10 and 11. In using the anvil gage, it is necessary to hold the body to be measured stationary during measurement, and it is necessary to properly and accurately position the body, as shown in FIGS. 10 and 11, to obtain the proper dimensional measurements. In practice, this may be done by rotating the body slightly and accepting or recording only the maximum and minimum relative readings as being representative of the respective circumscribed and inscribed circle diameters. It will be appreciated that with a full 360° rotation of the body as contemplated when using the roller type gages 20, 22, slight variations or irregularities of the fastener will also be measured, and taken into account in arriving at an aggregate degree of lobulation or out-of-round or K reading, or data measurement.

The invention further contemplates developing statistical data from measurements taken on a plurality of bodies or fasteners, which data may be utilized in lot control or processing control applications. The method also contemplates determining from the recorded data points of maximum deviation on the inscribed circle and circumscribed circle diameters of each body or fastener as related to mean measured values thereof.

It will be further noted that the measurement of the out-of-round or K dimension accomplished by the apparatus and method of the invention also effectively results in a measurement of what is normally called the pitch diameter or effective diameter in the case of a threaded fastener.

A program listing of modifications to the above-identified Databank Plus software for operating the data processor in accordance with the invention has been submitted herewith as a microfiche appendix.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A method for gaging the degree of lobulation of a body comprising one of a threaded fastener and a blank for a threaded fastener, said method comprising: providing gage means comprising at least three support elements which engage and support said body about its peripheral surface at locations spaced substantially symmetrically thereabout, such that said support elements are generally spaced in a circumferential array about an imaginary central axis; at least one but not all of said support elements being movable relative to said imaginary central axis so as to contact and follow said peripheral surface as said body is rotated in engagement with said at least three support elements; rotating said body in engagement with said at least three support elements; recording information corresponding to a movement of said at least one of said support elements during said rotating to form recorded data; and calculating from said recorded data information including the degree of lobulation of said body; wherein said calculating comprises utilizing data processing means for calculating the diameter of a circumscribing circle and an inscribing circle of said body and calculating one-half of the difference therebetween; the degree of lobulation being defined as said one-half of the difference between said diameters of said circumscribing circle and said inscribing circle.

2. A method for gaging the degree of lobulation of a body comprising one of a threaded fastener and a blank for a threaded fastener, said method comprising: providing gage means comprising a plurality of support elements in a spaced circumferential array about a central axis for supporting and engaging a peripheral surface of the body at spaced intervals thereabout; at least one but not all of said support elements being movable with said peripheral surface of said body during rotation of said body; rotating said body; recording information corresponding to said movement of said at least one of said support elements during said rotating of said body to form recorded data; and calculating from said recorded data the diameter of a circle circumscribing said body and the diameter of a circle inscribing said body and one-half of the difference therebetween; said one-half of said difference being defined as the degree of lobulation of said body.

3. The method of claim 2 wherein said calculating comprises calculating the degree of lobulation for a plurality of bodies and developing therefrom statistical in-process control data.

4. The method of claim 3 wherein the step of calculating further includes calculating mean values of the diameters of said inscribing and circumscribing circles and determining points of maximum deviation from said mean values.

5. Apparatus for measuring the degree of lobulation of a body comprising one of a threaded fastener and a blank for a threaded fastener, said apparatus comprising: gage means comprising at least three support elements in a spaced circumferential array about a central axis and located substantially symmetrically for surroundingly engaging and supporting said body while permitting rotation thereof; at least one but not all of said support elements being movable relative to said central axis so as to contact and follow said peripheral surface of said body as said body is rotated; recording means responsive to the movement of said at least one of said support elements during rotation of said body for recording information corresponding to said movement to form recorded data; and data processing means for developing information including the degree of lobulation of the body from said recorded data; wherein said data processing means includes means for calculating the diameters of a circumscribing circle and an inscribing circle of said body and one-half of the difference between said diameters, said one-half of said difference between said diameters being defined as the degree of lobulation of said body.

6. Apparatus according to claim 5 wherein said support elements provide at least three support surfaces for supporting said peripheral surface of said body at intervals spaced by substantially 120 degrees, at least one but not all of said support surfaces being movable to follow the peripheral surface of the body as the body is rotated.

7. Apparatus according to claim 5 wherein said support elements comprise three rollers and a shaft supporting each of said rollers for contacting and rotating with said body during rotation thereof, at least one but not all of said shafts being movable relative to said central axis for permitting its associated roller to maintain contact with and follow the peripheral surface of said body during rotation thereof; said associated roller comprising said at least one of said support elements.

8. The apparatus of claim 7 wherein said rollers have smooth, right cylindrical surfaces for engaging said body.

9. The apparatus of claim 7 wherein each of said rollers comprises a right cylindrical member having a plurality of spaced circumferential grooves arranged for complementary engagement with a thread of a threaded fastener comprising said body to be gaged, for determining the degree of lobulation substantially at the pitch diameter of the threaded fastener.

* * * * *